United States Patent [19]

Lins

[11] Patent Number: 4,978,258
[45] Date of Patent: Dec. 18, 1990

[54] CUTTING TOOL
[75] Inventor: Reinhard Lins, Sevelen, Switzerland
[73] Assignee: Hilti Aktiengesellschaft
[21] Appl. No.: 508,936
[22] Filed: Apr. 12, 1990
[30] Foreign Application Priority Data
  Apr. 14, 1989 [DE] Fed. Rep. of Germany ....... 3912248
[51] Int. Cl.⁵ .............................................. B23B 51/00
[52] U.S. Cl. ..................... 408/187; 175/292; 408/81; 408/127; 408/199
[58] Field of Search ......................... 408/79, 80, 81, 83, 408/127, 150, 186, 187, 195, 199; 173/263, 292, 331, 334

[56] References Cited
U.S. PATENT DOCUMENTS

| 959,585 | 5/1910 | Overly | 175/263 |
| 1,162,441 | 11/1915 | Bloss | 408/187 |
| 1,578,623 | 3/1926 | Zublin | 175/292 |

FOREIGN PATENT DOCUMENTS 1285845 12/1968 Fed. Rep. of Germany ...... 408/187
2415240 10/1975 Fed. Rep. of Germany .

Primary Examiner—Daniel W. Howell
Attorney, Agent, or Firm—Toren, McGeady & Associates

[57] ABSTRACT

A cutting tool for forming undercuts in boreholes includes a cutting member pivotally and rotatably supported in a tubular drive shaft. The combination of the drive shaft and cutting tool provide a ball joint so that the cutting tool is pivotally supported relative to the drive shaft axis. The drive shaft has an guidance bore for the cutting tool. Guidance stop faces in the guidance bore transmit rotational movement to a head forming a cutting member on the cutting tool. The head forms the undercut. The head rolls over the surface to be undercut.

9 Claims, 1 Drawing Sheet

CUTTING TOOL

BACKGROUND OF THE INVENTION

The present invention is directed to a cutting tool for forming undercuts or circumferentially extending widened sections in boreholes in a hard material component such as masonry, concrete and similar materials. The cutting tool includes a drive shaft and a cutting member at the leading end of the drive shaft. The cutting member has an axially extending shank section with a head containing cutting elements at an end of the shank section projecting from the drive shaft.

The German Offenlegungsschrift DE-OS 24 15 240 discloses a tool for forming cylindrical boreholes with a radial widening of the borehole as the tool advances. The tool includes a rotatable drive shaft, with a cutting head pivotably supported at the leading end of the shaft. A cardan joint provides the pivotable support for the cutting head.

To form the undercuts, the cutting head must be displaced by the drive shaft in a drilling direction with simultaneous rotation, whereby the cutting head pivots outwardly relative to the axis of the drive shaft. The rotary motion of the drive shaft is transmitted by the cardan joint to the cutting head. Such rotary motion of the cutting head around its own axis can lead to jamming, for instance when it impacts gravel or reinforcing steel causing malfunctions and high wear. Additionally, the undercuts can be located at different depths because of the type of undercut formation by displacement of the drive shaft in the borehole and different shapes of the borehole may be formed, which can lead to disadvantages when setting expansion anchors into such boreholes.

SUMMARY OF THE INVENTION

Therefore, it is the primary object of the present invention to provide a cutting tool for forming undercuts in boreholes which is distinguished by a lack of any tendency to malfunction, even when the tool impacts against gravel or reinforcing steel. Further, the tool permits the formation of undercuts of a definable shape and at a predetermined depth into a borehole.

In accordance with the present invention, the cutting tool is made up of a tubular drive shaft and a cutting member combining to form a ball joint for the pivotal support of the cutting member. The drive shaft has an axially extending guidance bore with a pair of oppositely located guidance stop faces for guiding a shank section of the cutting member in a position eccentric to the axis of the drive shaft at the ball joint.

Pivotal support of the cutting tool in the drive shaft by means of a ball joint assures that the cutting member can pivot relative to the drive shaft axis and is also free to rotate relative to the rotating drive shaft.

After the insertion of the drive shaft and the cutting member into a prefabricated borehole, as the drive shaft rotates, entrainment of the cutting member occurs with the slightest eccentric displacement of the shank section relative to the drive shaft axis. Such eccentricity develops because the cutting member is entrained downwardly during rotation of the drive shaft by friction in the ball joint and also by friction between the cutting member and the drive shaft, so that the cutting member deflects radially outwardly because of its unbalance due to the manner in which it is formed. In the event of a working direction outside the center of gravity, the eccentricity is achieved by the weight of the cutting member.

As the drive shaft rotates, centrifugal force acts on the cutting member and causes the cutting head to contact the borehole wall. Such contact imparts a rolling motion to the cutting member around its own axis opposite to the rotation of the drive shaft in addition to the entrainment afforded by the rotating drive shaft, whereby the cutting elements in a repetitive and alternating manner contact the borehole wall and use the rotational energy imparted to the cutting member for effecting the material removal by striking or impact. Further, a scraping type of material removal is superimposed on the impact type, because of the entrainment rotary motion provided by the drive shaft.

If the head of the cutting tool strikes against a piece of gravel or reinforcement steel, then the cutting head is displaced radially, as well as around its own axis, thereby preventing jamming.

With continued operation, the cutting tool creates a widening of the borehole surface with a shape corresponding to the outer surface contour of the cutting head, whereby the widening effect is achieved at the location in the borehole, predetermined by the position of the cutting head relative to the drive shaft, since the drive shaft is not displaced axially while the undercut in the borehole is being formed.

In a preferred arrangement, the ball joint is provided by a spherical head at a trailing end of the shank section and a cooperating spherical seat within the drive shaft.

This arrangement of the spherical joint permits, apart from simple assembly, a radially compact construction of the cutting tool. This is particularly advantageous for cutting tools utilized in the small diameter range of boreholes.

Guidance stop faces are preferably located in a guidance bore in the drive shaft through which the shank section of the cutting member extends. As a result, the guidance stop faces engage the shank section adjacent to the cutting head affording a favorable introduction of force.

Preferably, the guidance stop faces are formed in a part of the guidance bore where the bore changes from a circular bore to a bore elongated transversely of its axis. The stop faces are advantageously provided by an elongated hole extending eccentrically relative to the drive shaft axis, with the hole having a width corresponding to the diameter of the circular end of the borehole adjacent the ball joint. In a preferred arrangement, the elongated hole extends radially from the axis of the drive shaft to one side. The diameter of the circular part of the guidance bore has a diameter corresponding at least to the diameter of the shank section of the cutting member. When the cutting tool is introduced into a borehole, the axis of the tool is coaxial with the axis of the drive shaft, whereby the shank section and cutting head pass axially through the borehole. When the drive shaft is rotated about its axis, the entrained cutting member pivots outwardly from the drive shaft axis with the shank section being displaced in the elongated hole. The walls of the elongated hole act as guidance stop faces and move the outwardly pivoted cutting member in the rotational direction of the drive shaft due to the contact between the guidance stop faces and the shank section. As a result, there is a percussive motion of the cutting member with a circumferential rolling of its head on the borehole wall.

Preferably, the eccentricity of the elongated hole increases toward the leading end of the cutting member. At the leading end of the drive shaft in the leading end of the elongated hole, a shoulder limiting the outward pivoting of the cutting tool is formed, so that the shank section impacts radially against such shoulder. The axially extending opposite end of the elongated hole from the axis of the drive shaft extends at a uniform inclination or acute angle relative to the drive shaft axis from the location of the ball joint with the angle being in the range of 10° to 30° and preferably about 15°.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
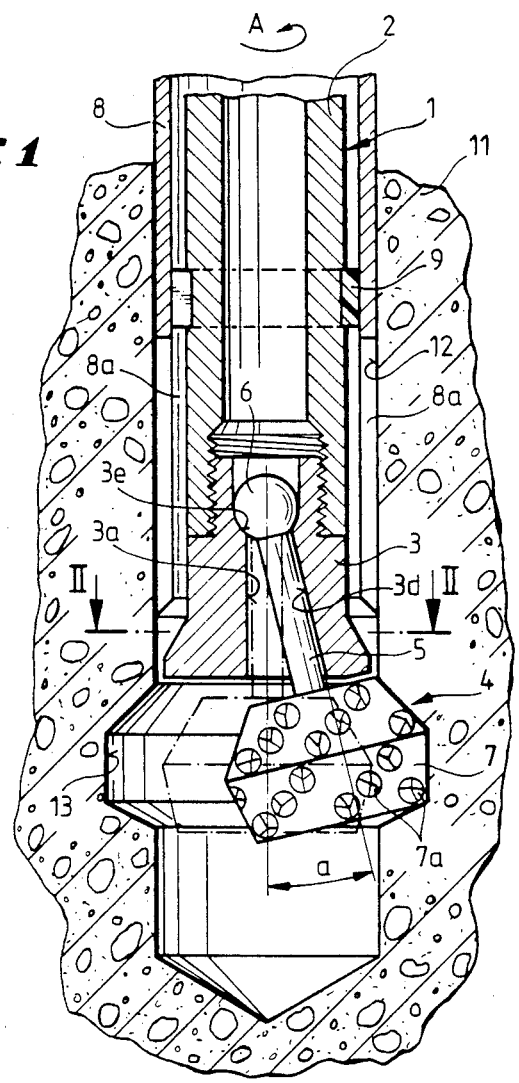
FIG. 1 is an axially extending sectional view showing a cutting tool embodying the present invention during operation.

In FIG. 1 the leading end of a cutting tool embodying the present invention is illustrated, made up of a drive shaft 1, formed by a hollow shaft 2, with a bearing bushing 3, screwed into the leading end of the shaft. A cutting member 4 is pivotably supported in the bearing bushing 3.

Figure 2:
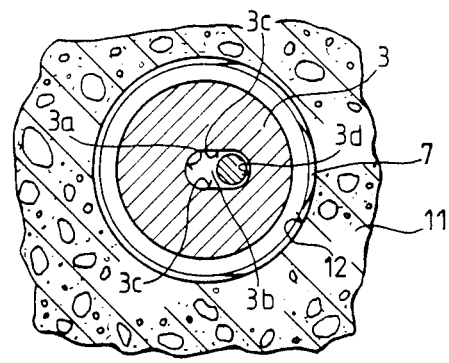
FIG. 2 is a sectional view taken along the line II—II in FIG. 1.

Cutting member 4 includes an axially extending shank section 5 with a spherical ball head 6 on its trailing end and a cutting head 7 on its leading end with cutting elements 7a located in the head. Head 7 projects outwardly from the leading end, the lower end in FIG. 1, of the bearing bushing 3. The leading end of the shank section 5 extends axially through a guidance bore in the bushing 3 and its leading end to which the head 7 is secured extends outwardly from the bearing bushing. The cutting member 4 is movable transversely of the axis of the drive shaft. The guidance bore has a central bore 3a at the trailing end, and the bore changes over into an elongated hole 3b, with the length of the hole extending transversely of the drive shaft axis increasing toward the leading end of the bearing bushing 3. As a result, the elongated hole 3b extends eccentrically relative to the axis of the drive shaft. The elongated hole has a width corresponding to the diameter of the central bore 3a and its width is slightly greater than the diameter of the shank section 5, note FIG. 2.

The elongated facing walls of the elongated hole 3b form guidance stop faces 3c for the shank section 5. Elongated hole 3b has an inclined base 3d extending at an acute angle of approximately 15° relative to the axis of the drive shaft 1. Spherical head 6 at the end of the shank section 5 is supported in a spherical seat 3e in the trailing end of the support bushing 3, whereby the cutting member 4 is freely rotatable and pivotally movable to a limited extent with respect to the drive shaft 1.

Hollow shaft 2 is laterally enclosed by an axially extending jacket 8 with the jacket being spaced radially outwardly from the outside surface of the hollow shaft. The hollow shaft is rotatably supported in the jacket 8 by a slotted slide ring 9. As can be seen in FIG. 1, at its leading end, the jacket 8 has axially extending slots 8a and its outside diameter is widened at the leading end.

The cutting tool serves to form an undercut or circumferentially extending widened section 13 in a prefabricated borehole 3 in a component 11 formed of concrete.

Before placing it in operation, the cutting tool is inserted to a predetermined depth in the borehole 12. The jacket 8 contacts the wall of the borehole in a centering manner. Axially extending slots 8a provide a radial springiness or resilience for the jacket 8 and facilitates the insertion of the tool into the borehole 12. During insertion, the axis of the cutting member 4 is co-axial with the axis of the drive shaft 1 and, as a result, shank section 5 is arranged concentrically within the central bore 3a and its leading end extends from the bushing 3.

Subsequently, when the drive shaft 1 is rotated in the direction of the arrow A in FIG. 1, it carries the cutting member 4 along in the same direction, due to the frictional forces existing in the ball joint provided by the ball head 6 and the spherical seat 3e. Because of the centrifugal forces developed, the cutting member 4 pivots radially outwardly, for among other reasons, due to the asymmetrical weight distribution of the cutting elements 7a, with the shank section 5 moving from the central position into the radially displaced position in the elongated hole 3b, as shown in FIG. 1. As soon as the shank section 5 moves from the central bore 3a, into the elongated hole 3b, the cutting member 4 is carried in the rotational direction of the drive shaft by one of the two guidance stop faces 3c, depending on the rotational direction of the drive. As a result, the cutting head 7 moves along the wall of the borehole 12 in the circumferential direction and is pressed against the wall by centrifugal force. The cutting members 7a on the head 7 remove the material of the component 11 in a percussive or impacting and scraping manner, so that the surface of the borehole gradually develops an undercut 13 with a shape corresponding to the general configuration of the head 7. As the cutting member 4 is rotated within the borehole, the head 7 can move radially inwardly toward the drive shaft axis counter to the centrifugal force, due to a lack of homogeneity in the material of the component 11, and then moves radially outwardly again impacting against the borehole wall, due to the centrifugal force. As a result, the cutting member 4 receives rotational impulses acting opposite to the rotary motion of the drive shaft 1. Formation of the undercut 13 is terminated as soon as the shank portion 5 contacts the base 3d of the elongated hole 3b, as is shown in FIG. 1. The base 3d prevents any further radially outward movement of the cutting head 7.

While specific embodiments of the invention have been shown and described in detail to illustrate the application of the inventive principles, it will be understood that the invention may be embodied otherwise without departing from such principles.

I claim:

1. Cutting tool for forming an undercut in a borehole drilled in a component of a hard material structure such as masonry, concrete and similar materials, comprising an axially elongated tubular drive shaft (1) having a first end and a second end, and a cutting member (4) mounted in and projecting outwardly from the first end of said drive shaft, said cutting member (4) comprises an axially extending shank section located within said drive shaft and having a first end and a second end, the first end of said shank section (5) projects outwardly from the first end of said drive shaft, and a cutting head (7) fixed to the first end of said shank section, said cutting head (7) having an outer surface with cutting members (7a) secured in the outer surface, wherein the improvement comprises means on said drive shaft and shank section for forming a ball joint at the second end of said shank section for pivotally supporting said cutting member, a central bore (3a) in said drive shaft located at said pivotal supporting means and having an axis co-axial with the axis of said drive shaft, a guidance bore in said drive shaft extending from said central bore to the first end of said drive shaft with said guidance bore changing from the central bore to a bore elongated transversely of the axial direction thereof at the first end of said drive shaft, and said guidance bore having guidance stop faces (3c) extending chordally of the axis of said drive shaft for guiding the pivotal movement of said cutting member in said guidance bore.

2. Cutting tool, as set forth in claim 1, wherein said ball joint comprises a ball head (6) at the second end of said shank section (5) and a spherical seat (3e) in said drive shaft (1).

3. Cutting tool, as set forth in claim 1, wherein said guidance stop faces (3c) extend in the axial direction of said drive shaft and are located on opposite sides of said shank section (5).

4. Cutting tool, as set forth in claim 3, wherein said stop faces extend in generally parallel relation between circular portions of said guidance bore.

5. Cutting tool, as set forth in claim 4, wherein said guidance stop faces (3c) are located in said elongated bore eccentrically with relation to the axis of said drive shaft.

6. Cutting tool, as set forth in claim 5, wherein said eccentric hole has a pair of opposite circular ends, one of said circular ends extends in the axial direction in parallel relation with the axis of said drive shaft and the other said end extends inclined with relation to the axis of said drive shaft with said other end having an increasing offset from the axis of said drive shaft in the direction from said central bore at said ball joint to the first end of said drive shaft.

7. Cutting tool, as set forth in claim 1, wherein said drive shaft (1) comprises an axially extending hollow shaft having a first end and a second end with said first end located closer to and spaced axially from the first end of said drive shaft, a bearing bushing secured in said hollow shaft and extending therefrom to the first end of said drive shaft, said means for forming a ball joint comprising a spherical seat within said bearing bushing and a ball head on the second end of said shank section positioned in said spherical seat.

8. Cutting tool, as set forth in claim 7, wherein an axially extending jacket (8) laterally encloses at least an axially extending portion of said drive shaft and is arranged to fit within a borehole in which said cutting tool is to form an undercut, said drive shaft spaced inwardly from said jacket, a slide ring (9) located within said jacket in contact with an inner surface of said jacket and an outer surface of said drive shaft, and said jacket having a first end and a second end with said first end closer to the first end of said drive shaft and said jacket being slotted in the axial direction from the first end toward the second end thereof.

9. Cutting tool, as set forth in claim 6, wherein said other end (3d) of said elongated hole inclined at an angle of approximately 15° relative to the axis of said drive shaft.

* * * * *